Figure 3:
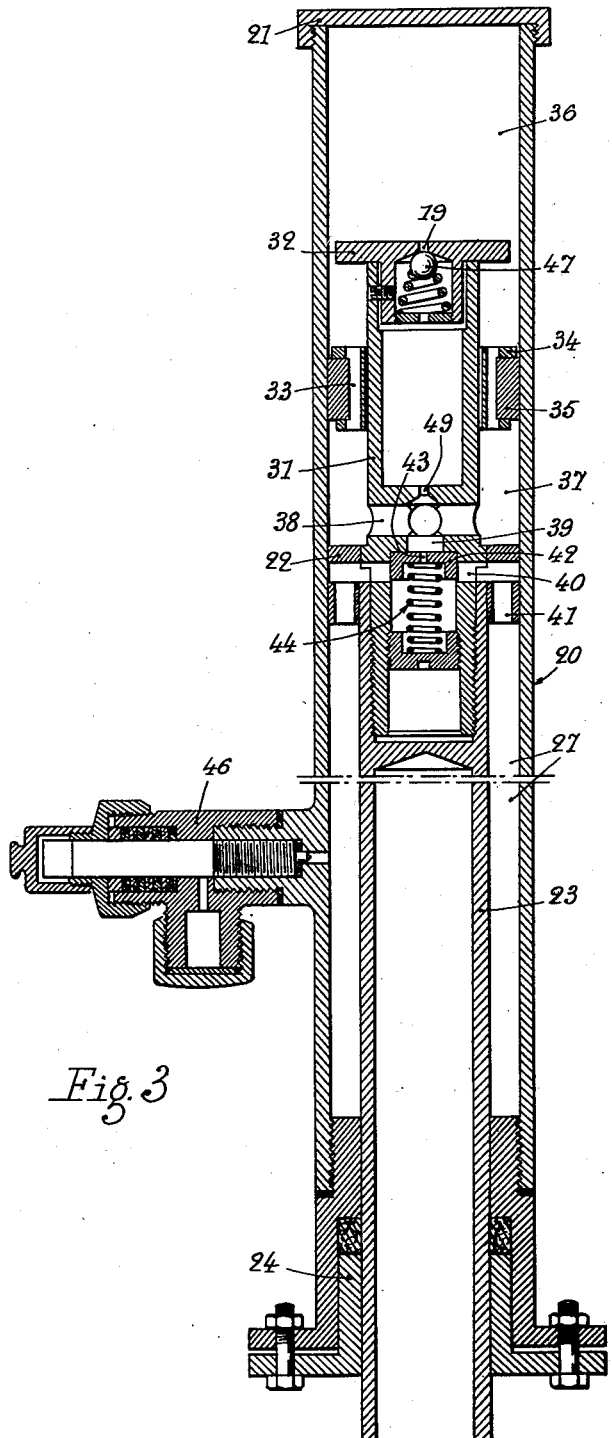

Nov. 9, 1937.   J. MERCIER   2,098,398
SHOCK ABSORBER
Filed March 12, 1936   2 Sheets-Sheet 1
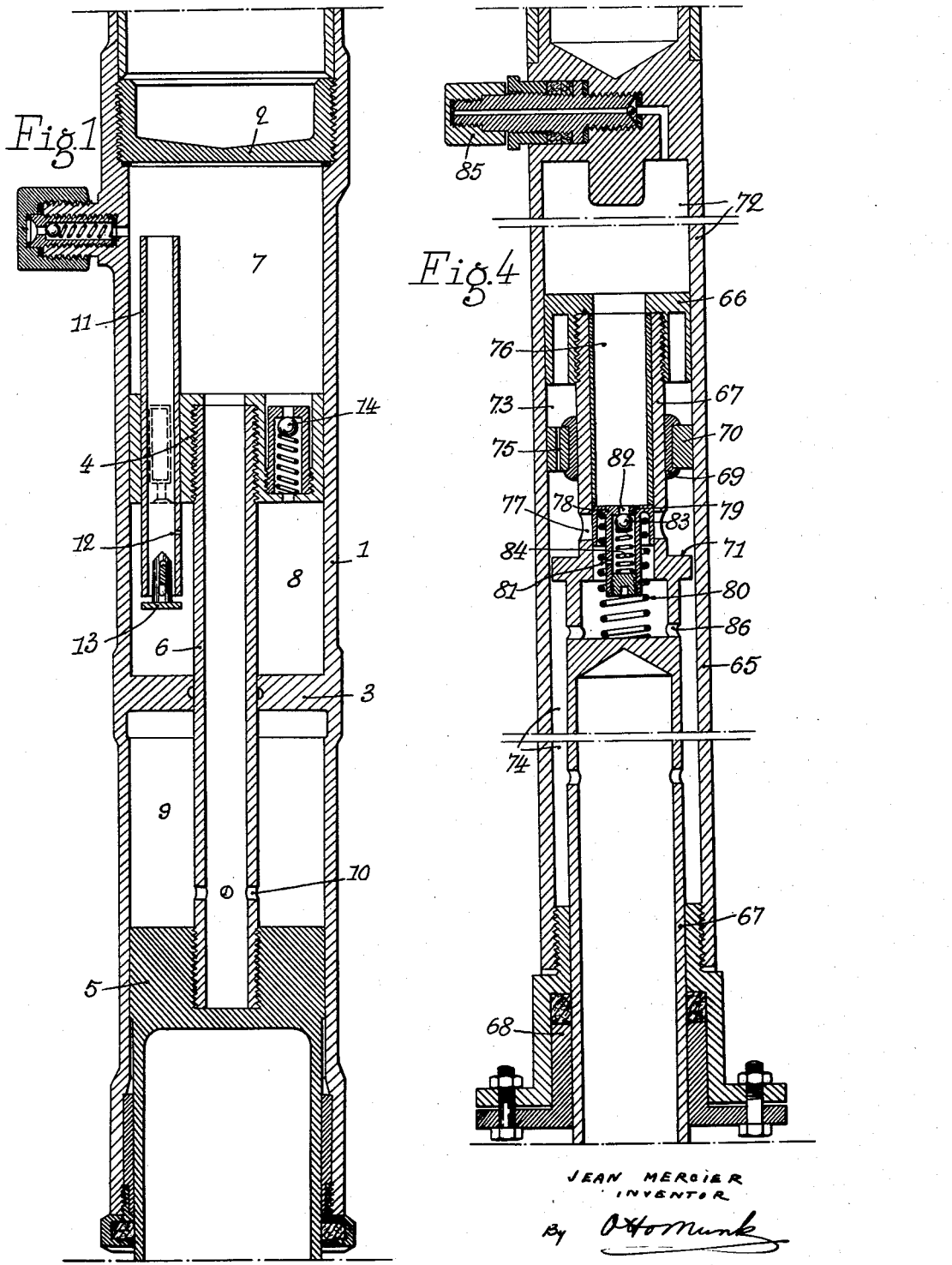
JEAN MERCIER
INVENTOR
By Otto Munk
his Att'y.

Nov. 9, 1937.  J. MERCIER  2,098,398
SHOCK ABSORBER
Filed March 12, 1936  2 Sheets-Sheet 2

JEAN MERCIER
INVENTOR

By Otto Munk
his ATT'Y.

Patented Nov. 9, 1937

2,098,398

UNITED STATES PATENT OFFICE 2,098,398

SHOCK ABSORBER

Jean Mercier, Neuilly-sur-Seine, France

Application March 12, 1936, Serial No. 68,492
In France March 19, 1935

14 Claims. (Cl. 267—64)

Shock absorbers and landing gears are already known of the type in which a valve device closes a channel of communication between a deformable chamber and an adjacent container when the opposite walls of the deformable chamber are displaced with relation to each other from their initial position through a distance which is less than their maximum relative displacement, and again opens this channel of communication during the return to the initial position and before the device passes through the position in which the closing was effected.

According to the present invention, in the shock-absorbers of this type, the communicating channel is further controlled by a check valve which allows the circulation of the fluid only in one direction in the said channel, and the circulation in the other direction can only take place through a very small orifice.

This improvement is particularly advantageous for aeroplane landing gears, as it eliminates the drawback consisting in the fact that when starting from the ground, the load brought upon the landing gear gradually diminishes until in full flight, and the sudden expansion of the fluid contained in the landing gear, due to this removal of the load, may cause an abrupt contact between the parts of the landing gear at the end of the movement.

Another object of the invention is to improve the valve device between said deformable chamber and said container.

The accompanying drawings show, by way of example, four embodiments of the object of the invention.

Figs. 1, 2, 3 and 4 are longitudinal sections of said four embodiments respectively.

With reference to the embodiment of Figure 1, in a cylinder 1 provided with an end wall 2 and with a partition 3, are movable, on the respective sides of the said partition, two pistons 4 and 5 connected together by a hollow rod 6, thus forming three chambers of variable volume 7—8—9. The chambers 7 and 9 are in constant communication through the hollow rod 6 and through the orifice 10 pierced in the said rod. In the piston 4 is slidable by hard friction a tube 11, which is pierced with a very small orifice 12 and may be closed by a check valve 13 mounted on the tube 11. A safety-valve 14 contained in the piston 4 provides for the flow of the fluid from the chamber 7 into the chamber 8, in the case of an excessive pressure in the chamber 7.

When under the effect of a shock, for instance during the landing of an aeroplane, the pistons 4 and 5 move towards the end wall 2 of the cylinder 1, the volume of the chambers 7 and 9 will thus be reduced, and the volume of the chamber 8 will increase. The fluid in the chambers 7 and 9 flows into the chamber 8. When the amount of the relative movement between the pistons and the cylinder reaches a stated value, the end wall 2 of the cylinder will close the upper end of the tube 11, and the fluid will be compresed in the chambers 7 and 9, thus producing the desired damping effect, and the tube 11 slides in the piston 4. During the return to the initial position, the tube 11 will at once separate from the end wall 2 of the cylinder. The fluid compressed in the chambers 7 and 9 will at once expand, and will flow into the chamber 8, thus preventing all rebounding effects.

If on the contrary, when running upon the ground, the effect of a shock should move the pistons 4 and 5 away from the wall 2 of the cylinder, the fluid will flow in the first place from the chamber 8 into the cylinders 7 and 9 through the orifice 12 and the tubes 11 and 6. When near the end of the expansion stroke, the orifice 12 is closed by the piston 4, thus forming an air cushion which prevents the entire expansion. The compressed air returns to the chamber 8 through the valve 13 during the return of the shock-absorber to the mean position.

If the shock-absorber is employed with aeroplane landing gear, when the aeroplane leaves the ground, the load on the landing gear will be thus reduced, and the weight of the wheels supported by the pistons 4 and 5 can now lower these pistons and bring the piston 4 abruptly upon the partition 3. In order to obviate this drawback, the valve 3 is provided, and it closes the tube 11 when the aeroplane starts up. Thus the air compressed in the chamber 8 will prevent all abrupt contact between the parts. The small orifice 12 allows the air compressed in the chamber 8 to gradually expand into the chambers 7 and 9.

Figure 2:
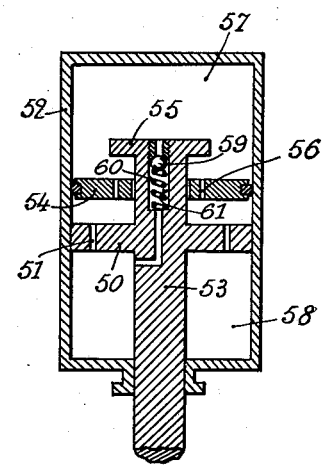

In the embodiment shown in Figure 2, a piston 50, pierced with one or more orifices 51, is movable in a cylinder 52. The piston-rod 53 extends on either side of said piston, and an extended part of said piston-rod, which is directed towards the interior of the cylinder, traverses with easy friction a disc 54 which is slidable by hard friction in the cylinder 52. This extended part of the said piston-rod is terminated by a disc 55 adapted to close the orifice or orifices pierced in the disc 54, which latter may close the orifices 51 of the piston. A safety-valve 59, urged upon its seat by a spring 60, normally closes off a channel 61 which is formed in the piston-rod 53 and makes connection between the chambers 57 and 58, situated on the respective sides of the said piston.

When the said piston moves into the cylinder by the effect of a shock, the fluid contained in the cylinder will flow freely from the chamber 57 into the chamber 58 through the orifices 56 and 51, until the said piston 50 makes contact with the disc 54. The orifices 51 and 56 will now be closed. The disc 54 is moved by the piston 51, and the fluid which is held in the chamber 57 will be compressed to an increasing degree, and will act against the movement of the piston. If, however, during this compression, the pressure should become excessive in the chamber 57, the valve 59 will be lifted from its seating, and the fluid can thus enter the chamber 58.

When the piston returns to the initial position, it will at once separate from the disc 54, and this will thereupon make the connection between the chambers 57 and 58 through the orifices 56 and 51, thus preventing all rebounding action.

Inversely, when the shock has the effect of separating the piston 50 from the disc 54, the fluid will flow freely from the chamber 58 into the chamber 57 until the disc 55 makes contact with the disc 54, and then the fluid will be compressed in the chamber 58, thus acting against the movement of the piston. When the piston returns to the initial position, the disc 55 separates from the disc 54 and again makes the connection between the chambers 57 and 58.

The embodiment shown in Fig. 3 relates particularly to the case of aeroplane landing gear, and to this is added a check valve of the type described with reference to the embodiment of Fig. 1. In the cylinder 20 provided with an end-piece 21, is movable a piston 22, the hollow rod 23 of which passes through a suitable stuffing-box 24. The piston 22 comprises at its upper part an appendage 31 terminated by a disc 32 adapted to close the orifices 33 in a disc 34, through which the said appendage 31 passes by easy friction, said disc 34 being secured to packing rings which are applied, by hard friction, against the cylinder 20. The disc 34 divides the space in the said cylinder between the upper end 21 and the piston 22, into two chambers 36 and 37 which are in normal communication through the orifices 33. The chambers 27 and 37 may be connected together by conduits 38—39—40—41 formed in the appendage 31 and in the piston 22. A valve 42 pierced with a small orifice 43 serves to close the conduit 39 under the action of a spring 44 bearing upon a plug 45 screwed into the said piston. A valve 46 serves to fill the apparatus with air under pressure. A safety-valve 47, urged upon its seating by a spring 48, normally stops the communication between the chamber 36 and the chamber 27 which may take place through the orifices 19—49—39—40—41.

In the case of the absorption of slight shocks which cause only reduced movements of the piston 22, the rising movements of the piston will take place freely by the flow of air from the chambers 36—37 into the chamber 27 while lowering the valve 42, while the downward movements of the piston are braked, as the air cannot flow from the chamber 27 into the chambers 36—37 except through the small orifice 43. In this way, the suspension is extremely flexible.

In the case of a considerable shock by which the piston 22 is moved to a great degree into its cylinder 20, the air contained in the chambers 36—37 is forced into the chamber 27 until the piston 22 makes contact with the disc 34. The orifices 33 are now closed, and the conduit 38 is cut off by the disc 34. The piston then draws forward the disc 34, and the air contained in the chamber 36 is compressed to an increasing degree according as the piston 22 comes near the end part 21 of the cylinder, thus damping the upward movement of the piston at an increasing rate. However, should the pressure become excessive in the chamber 36, the valve 47 will rise from its seating, and the fluid can thus flow into the chamber 27. When the device returns to the initial position, the piston will at once separate from the disc 34, and thus the air compressed in the chamber 36 may expand into the chamber 37; the air in the chamber 27 will flow gradually into the chamber 37 through the small orifice 43, thus damping the return movement to the initial position.

If for any reason the piston should tend to separate from the end 21 of the cylinder, for instance during the starting of an aeroplane, which has the effect of reducing the load upon the landing gear, the air is compressed in the chamber 27 and forms an air cushion which prevents any abrupt contact between the piston 22 and the stuffing-box 24. The air compressed in the chamber 27 gradually expands through the small orifice 43, in the first place into the chambers 36 and 37, and then only into the chamber 37 when the piston has moved downwardly for a certain distance, thus closing the orifices 33 by means of the disc 32.

The embodiment shown in Fig. 4 comprises a cylinder 65 in which is movable a piston 66, the hollow rod 67 of which traverses a stuffing-box of any type 68. A ring 69 which is traversed with easy friction by a rod 67, carries packing members 70 fitting by hard friction against the cylinder 65. A rod 67 is provided with a shoulder 71, and thus the disc 69—70 may be driven downwardly by the piston 66 and upwardly by the shoulder 71. The cylinder is divided by the piston 66 and the disc 69—70 into three chambers 72—73—74. The chambers 73 and 74 communicate with each other through one or more orifices or passages 75 formed in the disc 69—70. The chambers 72 and 74 may communicate with each other through the conduit 76 formed in the interior of the rod 67, and through the orifices 77 pierced in the rod 67, when the valve 78, pierced with a small orifice 79 and normally impelled upwardly by the spring 80, is lowered. The valve 78 is further pierced with a lateral orifice 81 and with a central orifice 82, which is normally closed by a safety-valve 83, urged by a spring 84. A valve 85 serves to fill the apparatus with air or other fluid under pressure.

The operation of the shock-absorber shown in Fig. 4 resembles that of the shock-absorber shown in Fig. 3.

For slight shocks, the rising movements of the piston 66 take place freely and the air passes from the chamber 72 into the chamber 74, thus lowering the valve 78, whilst the descending movements of the piston are impeded, as the air can only pass from the chamber 74 into the chamber 72 by passing through the orifices 86 in the rod 67 and the small orifice 79 in the valve 78.

When a considerable shock occurs, the air again passes freely from the chamber 72 into the chamber 74 until the orifices 77 come adjacent the disc 69—70. At this time, the shoulder 71 draws with it the disc 69—70, and the air contained in the chamber 72 becomes compressed. In the case of an excessive pressure, the safety-valve 83 allows air to pass from 72 to 74. On the return to the idle position, the orifices 77 are at once uncovered, and the compressed air in the chamber 72 can now expand, thus reducing the effect of the rebounding to a minimum. In the same manner as in the case shown in Fig. 2, when the aeroplane starts up, the piston descends and compresses the air in the chamber 74, thus preventing an abrupt shock against the stuffing-box 68.

It is obvious that the invention is not limited to the forms of construction herein described, which are given solely by way of example.

Having now described my invention what I claim as new and desire to secure by Letters Patent is:

1. In a damping device, in combination, a container, fluid compressing means provided with two opposite walls adapted to be moved towards and away from each other, communicating means between said container and said fluid compressing means, whereby said fluid compressing means is adapted to discharge fluid into said container and to receive fluid from said container when said opposite walls are moved with relation to each other, intercepting means frictionally connected to one of said opposite walls and adapted to be controlled by the other of said walls after a relative displacement between said opposite walls from their initial relative position corresponding to a portion of their maximum relative displacement and adapted to close said communicating means after said portion of the maximum relative displacement and to open said communicating means as soon as said opposite walls are returned towards their initial relative position, a check valve in said communicating means adapted to check the circulation of the fluid only in one direction in said communicating means, and a small passage between said container and said fluid compressing means permanently allowing a reduced circulation of fluid between said container and said fluid compressing means.

2. In a damping device according to claim 1, the further feature consisting in a conduit between said container and said compressing means, and a spring actuated safety valve in said conduit adapted to allow fluid to flow only from said compressing means into said container when the pressure in said compressing means exceeds a determined value.

3. In a damping device according to claim 1, the further feature consisting in the fact that said intercepting means is frictionally connected to one of said walls and is adapted to close said communicating means when the relative displacement between said walls from their initial relative position has brought said intercepting means against a stop surface operatively connected with the other of said walls and to open said communicating means as soon as said opposite walls are returned towards their initial relative position.

4. In a damping device according to claim 1, the further feature consisting in the fact that said intercepting means comprises an annular member frictionally engaged with one of said walls and adapted to close said communicating means when the relative displacement between said walls from their initial relative position has brought said annular member against a stop surface operatively connected with the other of said walls and to open said communicating means as soon as said opposite walls are returned towards their initial relative position.

5. In a damping device in combination, fluid compressing means comprising two parts, that is a cylinder provided with two transversal walls and a piston adapted to be guided between said walls in said cylinder and dividing said cylinder into two chambers, communicating means between said two chambers, an annular member frictionally engaging one of said parts and adapted to close said communicating means when the relative displacement between said parts from their initial relative position has brought said annular member against a stop surface operatively connected with the other of said parts and to open said communicating means as soon as said parts are returned towards their initial relative position, a check valve adapted to check the circulation of the fluid only in one direction in said communicating means, and a small passage between said two chambers permanently allowing a reduced circulation of fluid between said chambers.

6. In a damping device in combination, a cylinder provided with two transversal walls, a piston adapted to be guided between said walls in said cylinder and dividing said cylinder into two chambers, communicating means between said two chambers, a stop surface secured to said piston, and between said piston and said stop surface, intercepting means frictionally engaging said cylinder and adapted to close said communicating means when the relative displacement between said piston and said cylinder has brought said intercepting means against said piston or said stop surface and to open said communicating means as soon as said piston and said cylinder are returned towards their initial relative position.

7. In a damping device according to claim 6, the further feature consisting in a conduit between said chambers through said piston, and a spring actuated safety valve in said passage adapted to allow fluid to flow only in one direction in said passage.

8. In a damping device according to claim 6, the further feature consisting in a check valve adapted to check the circulation of the fluid only in one direction in said communicating means, and a small passage between said two chambers permanently allowing a reduced circulation of fluid between said chambers.

9. In a damping device in combination, a cylinder provided with two transversal walls, a piston adapted to be guided between said walls in said cylinder and dividing said cylinder into two chambers, communicating means between said two chambers through said piston, a stop surface secured to said piston at a distance from said piston, between said piston and said stop surface an annular member frictionally engaging said cylinder and adapted to close said communicating means when the relative displacement between said piston and said cylinder has brought said annular member against said piston or said stop surface and to open said communicating means as soon as said piston and said cylinder are returned towards their initial relative position.

10. In a damping device according to claim 9, the further feature consisting in a check valve adapted to check the circulation of the fluid only in one direction in said communicating means, an orifice in said check valve, a spring actuated safety valve adapted to cover said orifice and to allow fluid to flow in a contrary direction to the direction of flow checked by said check valve, and a small passage between said two chambers permanently allowing a reduced circulation of fluid between said chambers.

11. In a cylinder containing a piston adapted to be moved in said cylinder and provided with at least a conduit through said piston affording communication between the two spaces situated on both sides of said piston, an obturating device consisting in a rod secured on said piston, a stop member on said rod at a distance from said piston, and between said piston and said stop member an annular member frictionally engaging said cylinder and traversed by said rod and adapted to close said conduit when the relative displacement between said piston and said cylinder has brought said annular member against said piston or said stop member and to open said passage as soon as said piston and stop member have been brought away from said annular member, said annular member being provided with a passage out of coincidence with said conduit.

12. In a cylinder containing a piston adapted to be moved in said cylinder and provided with a conduit through said piston affording communication between the two spaces situated on both sides of said piston, an obturating device consisting in a hollow rod secured on said piston and having its interior hollow chamber in coincidence with said conduit and provided with at least one substantially transversal perforation in said rod, whereby said hollow chamber in said rod communicates with one space on one side of said piston through said perforation and with the other space on the other side of said piston through said conduit through said piston, a stop member on said rod at a greater distance from said piston than said perforation, and between said piston and said stop member an annular member frictionally engaging said cylinder and traversed by said rod and adapted to close and to open said perforation during the relative displacements between said piston and said cylinder, said annular member being provided with a passage out of coincidence with said perforation.

13. In a damping device according to claim 1, the further feature consisting in the fact that said intercepting means comprises an open-ended tube frictionally engaging one of said walls and adapted to close said communicating means when the relative displacement between said walls from their initial relative position has brought said open-ended tube against a stop surface operatively connected with the other of said walls and to open said communicating means as soon as said opposite walls are returned towards their initial relative position.

14. In a damping device in combination, a cylinder provided with two transversal walls, a piston adapted to be guided between said walls in said cylinder, whereby two chambers are formed in said cylinder on either side of said piston, communicating means between said two chambers, an open-ended tube frictionally engaging said piston and adapted to close said communicating means when the relative displacement between said piston and said cylinder from their initial relative position has brought said open-ended tube against one of said walls and to open said communicating means as soon as said walls are returned towards their initial relative position, a check valve in said open-ended tube adapted to check the circulation of the fluid only in one direction in said open-ended tube, and a small passage between said two chambers permanently allowing a reduced circulation of fluid between said chambers.

JEAN MERCIER.